United States Patent [19]

Culkin et al.

[11] Patent Number: 4,689,134
[45] Date of Patent: Aug. 25, 1987

[54] NON ION SELECTIVE MEMBRANE IN AN EAVF SYSTEM

[75] Inventors: Joseph B. Culkin; Adam Koffler, both of Stamford, Conn.

[73] Assignee: Dorr-Oliver Inc., Stamford, Conn.

[21] Appl. No.: 886,585

[22] Filed: Jul. 16, 1986

Related U.S. Application Data

[62] Division of Ser. No. 724,859, Apr. 18, 1985, Pat. No. 4,615,786.

[51] Int. Cl.$^4$ ............................................. C25B 13/08
[52] U.S. Cl. ........................................ 204/296; 521/27
[58] Field of Search ............... 204/182.2, 182.3, 182.4, 204/296, 301; 521/27

[56] References Cited

U.S. PATENT DOCUMENTS

| | | | |
|---|---|---|---|
| 3,227,662 | 1/1966 | Kollsman | 204/182.4 |
| 3,725,235 | 4/1973 | Mintz | 204/296 |
| 3,853,721 | 12/1974 | Darlington et al. | 204/296 |
| 4,341,615 | 7/1982 | Bachot et al. | 204/296 |
| 4,419,209 | 12/1983 | Klinkowski | 204/296 |
| 4,432,860 | 2/1984 | Bachot et al. | 204/296 |
| 4,539,085 | 9/1985 | Bachot et al. | 204/296 |

FOREIGN PATENT DOCUMENTS 49-29428 8/1974 Japan .................................. 204/296

Primary Examiner—John F. Niebling
Assistant Examiner—Terryence Chapman
Attorney, Agent, or Firm—Paul D. Greeley

[57] ABSTRACT

A system and apparatus for dewatering a suspension of solids in a carrier liquid by means of an electrically augmented vacuum filter having an anodic electrode structure comprising an anode and a liquid impervious wall, wherein the wall is a non ion selective membrane which is permeable to both cations and anions. The non ion selective membrane being impervious to the suspension solids, carrier liquid, electrolyte and gaseous electrode reaction products. This non ion selective membrane comprises a substrate and a solid polymeric film, wherein the substrate is a cloth support and the solid polymeric film comprises a cation exchange resin, an anion exchange resin and a binder. The charge transfer numbers of the non ion selective membrane $t^+$ is in the range of 0.20 to 0.80 and $t^-$ in the range of 0.80 to 0.20, respectively.

2 Claims, 4 Drawing Figures

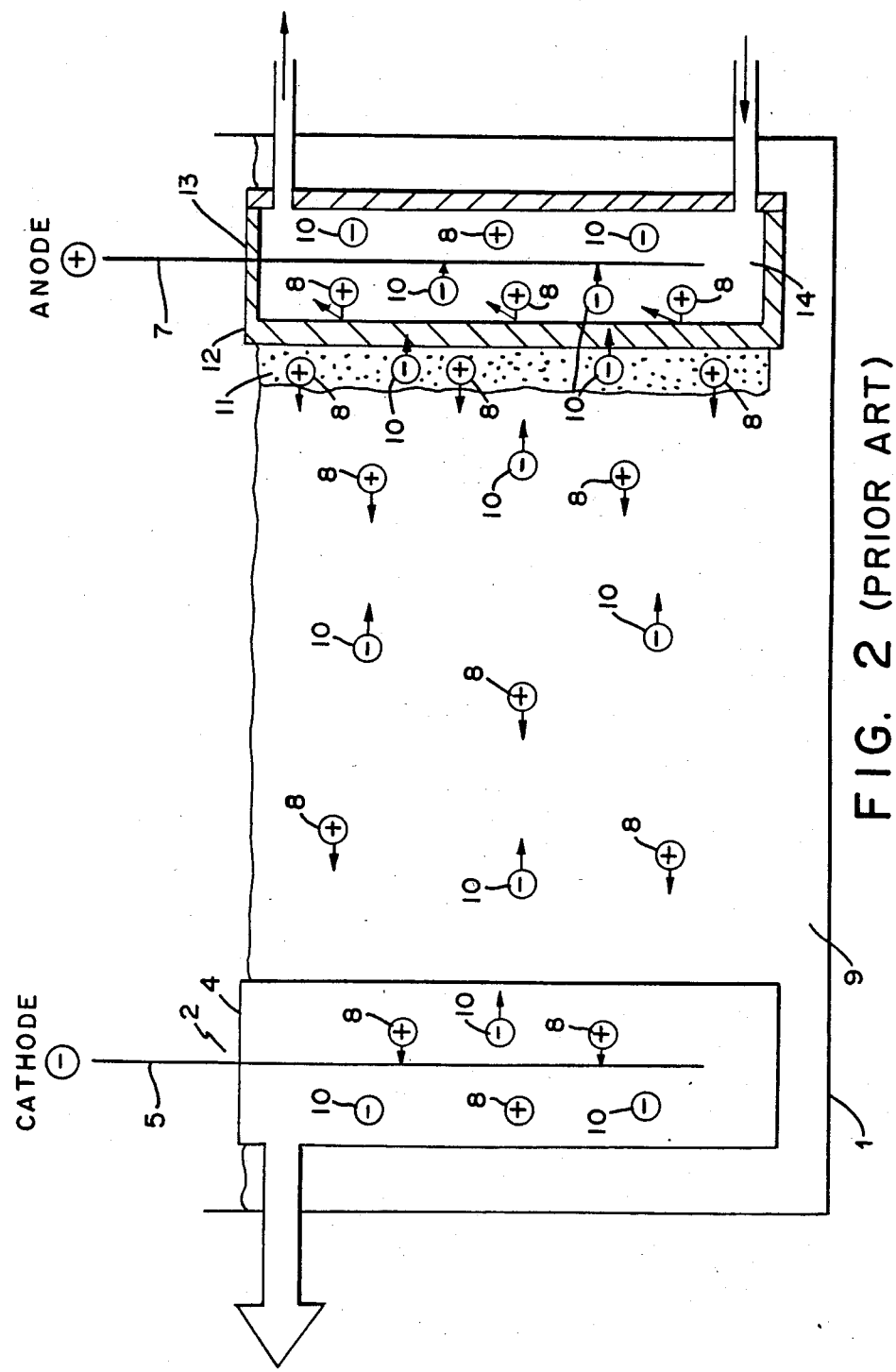

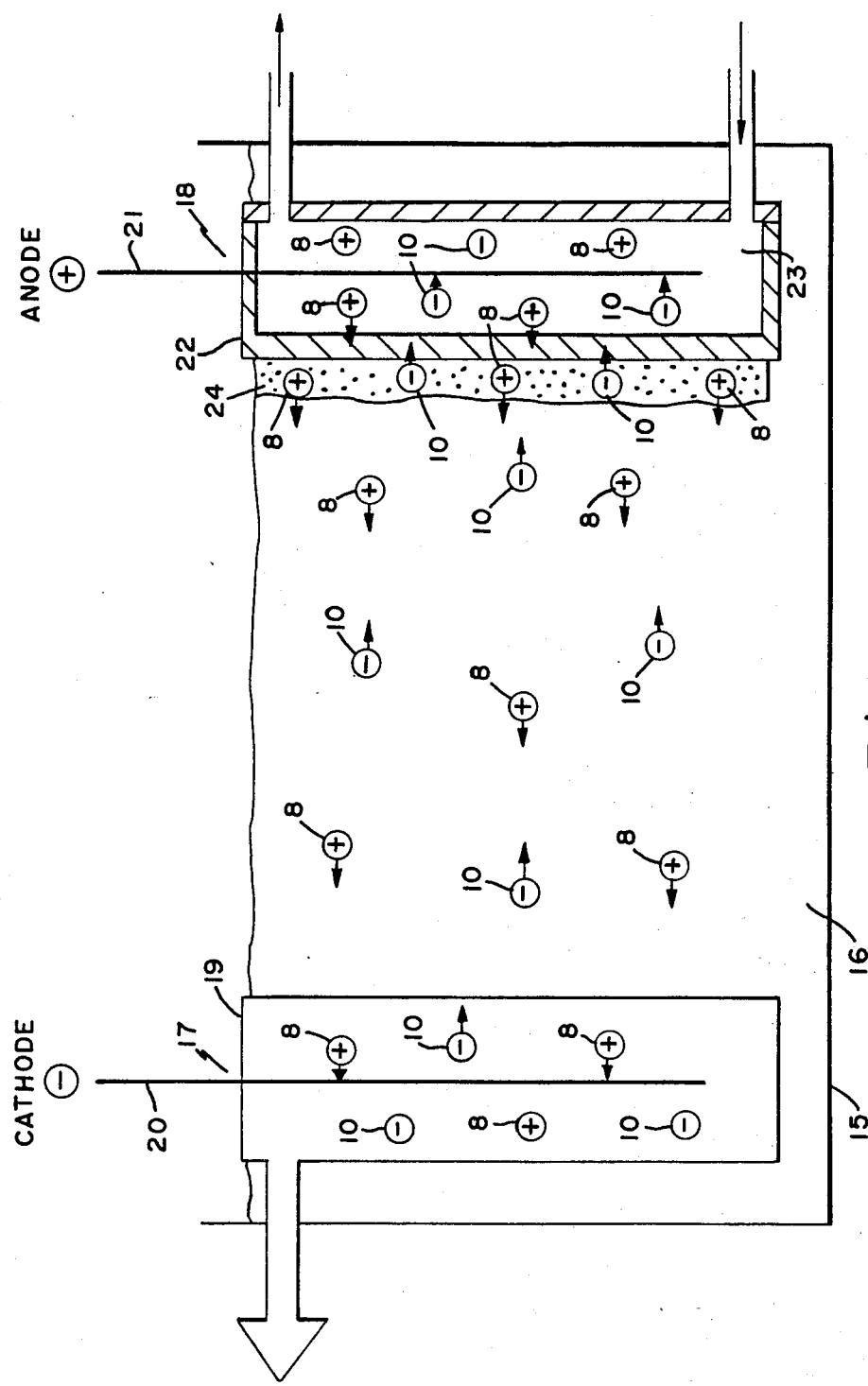

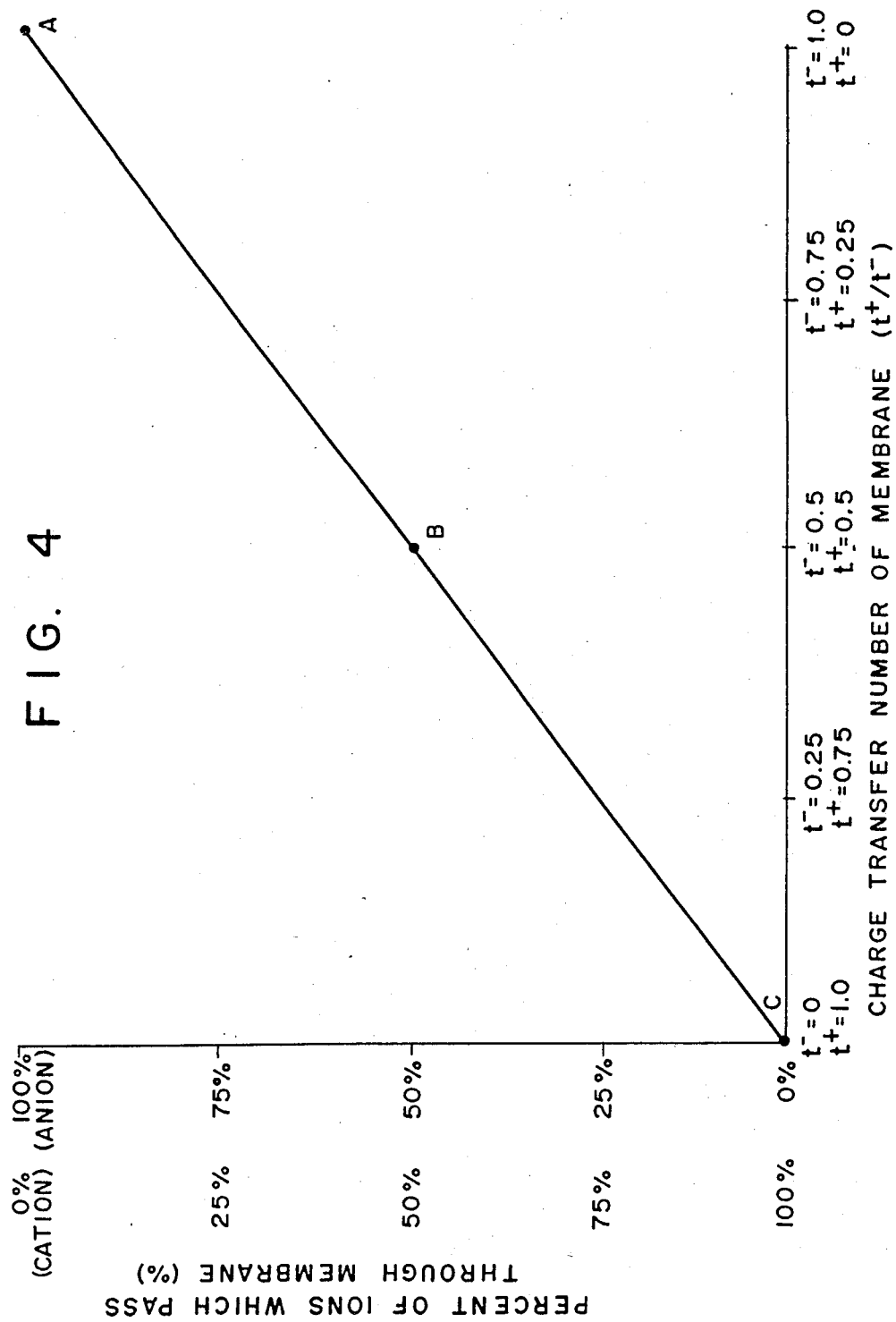

NON ION SELECTIVE MEMBRANE IN AN EAVF SYSTEM

This is a division of application Ser. No. 724,859 filed Apr. 18, 1985, now U.S. Pat. No. 4,615,786.

BACKGROUND OF THE INVENTION

The present invention relates to a system and apparatus for dewatering a suspension of solids in a carrier liquid by means of an electrically augmented vacuum filtration (EAVF) system, wherein an anodic electrode structure comprises a non ion selective membrane which is permeable to both cations and anions, but which is impervious to the suspension of solids, carrier liquid, and electrolyte. The non ion selective membrane according to the present invention comprises a substrate and a solid polymeric film, wherein the film comprises a cation exchange resin, an anion exchange resin and a binder.

The use of an EAVF system for dewatering a suspension of solids in a carrier liquid is described in U.S. Pat. Nos. 4,168,222 and 4,207,158. These patents describe a means for dewatering a suspension of solids in an electric field which is controllably maintained between opposing electrodes, to cause the solids to migrate relative to the carrier liquid to form a layer or cake on one set of electrode structures in which the electrode elements are positioned within ion-pervious walls and immersed in a selected electrolyte, while allowing carrier liquid to be withdrawn under vacuum in the opposite direction through the liquid-pervious wall of a hollow, counter electrode structure, and wherein the layer or cake material maybe detached from the first electrode structure during exposure from the suspension. The ion-pervious wall of the counter electrode structure in U.S. Pat. No. 4,168,222 comprise a chemically and electrically neutral filter media or permeable porous membrane which, the film-like nature or otherwise requiring support, maybe backed by a chemically and electrically neutral grid so that a planar electrode filter surface is presented to the slurry being treated. Furthermore, a vacuum is applied internally to the counter electrode to reduce the pressure on the filter media when the electrode is in the raised position for doctoring of the cake of solids formed thereon, whereby the vacuum prevents the loss of electrolytes and/or rupture of the filter media.

U.S. Pat. No. 4,362,612 also discloses the use of an ion non-selective permeable membrane which is directed to an apparatus for isoelectric focusing, wherein a plurality of ion non-selective permeable membranes are used to streamline the flow of liquid while allowing interchange of fluid constituents there-between. These membranes allow interchange of fluid constituents therebetween while providing the desired streamlining. Thus, the ion non-selective permeable membranes according to U.S. Pat. No. 4,362,612 is liquid permeable which would result in loss of electrolyte from the electrode structure similar to U.S. Pat. No. 4,168,222 which is undesirable.

It is a disadvantage of U.S. Pat. Nos. 4,168,222, 4,207,158 and 4,362,612 that the ion pervious wall or ion non-selective permeable membrane permits the loss of electrolyte from the anodic electrode structure. The electrolyte which passes through the ion-pervious wall has a detrimental effect on both the cake formed on the ion-pervious wall of the anodic electrode structure and the filtrate or carrier liquid of the bath.

It has also been known to use ion permeable membranes in electrodialysis as apparently described in U.S. Pat. No. 3,510,417, wherein the ion permeable membranes can selectively effect the permeation of the ions of a smaller valance from among those having the same charge. The ion exchange membrane for selectively transfering ions of the same charge in accordance with U.S. Pat. No. 3,510,417 are composed of insoluble, infusable synthetic organic polymers having an ionic group chemically bonded thereto. Accordingly, the ion permeable membrane can be either a cationic exchange membrane, those having active acidic functional groups such as —COOH bonded to the polymer, matrix or an anionic exchange membrane, those having a nitrogen-containing active based group such as quateranry ammonium, amino group, quanidyl group, and dicyandiamidine group bonded to the polymer matrix.

Perm-selective membranes have recently been used in EAVF systems as apparently described in U.S. Pat. No. 4,312,729 (Wills). Wills appears to describe that a perm-selective membrane can be used in an electrokinetic cell of an electrically augmented vacuum filter to prevent a migration of anions from the anode and optionally cathode compartments. The perm-selective membrane in the form of a film laminated to a support grid effectively prevents migration of anions into the cake filter and migration of fine particles solids to be filtered from the slurry into the anolyte and/or catholyte (Also see U.S. Pat. No. 4,419,209).

It is a disadvantage of U.S. Pat. Nos. 3,510,417, 4,312,729 and 4,419,209 in that the membranes are ion selective. That is, they teach the use of either an anion selective membrane or cation selective membrane which result in the following problems when such membranes are used in an EAVF system.

When, for example, an ion selective membrane is used at the anode in an EAVF system for dewatering a suspension of solids in a carrier liquid certain disadvantages occur. If a cationic ion selective membrane is used at the anode then the cake of suspension solids formed on the membrane has a significant increase in soluble ion concentration due to the impermeability of the membranes to anions which are attracted towards the anode, and the permeability of the membranes to cations which pass from the anolyte into the cake to satisfy charge neutrality. Conversely, if an anionic selective membrane is used at the anode then the cake of suspension solids formed on the membrane is depleted of cations.

In U.S. Pat. No. 4,312,729 (Wills) it is proposed that ion selective membrane be placed around the anodic electrode to prevent the migration of anions from the anode into the filter cake and the migration of fine particles solids to be filtered from the slurry into the anolyte. In this instance reverse dialyzing occurs wherein anions are attracted toward the anode and pass through the cake formed on the cation selective membrane but which are unable to pass through the cation selective membrane and become trapped in the cake thus causing anion build-up in the cake whereby the cake becomes contaminated while the pH is moderate. Although a moderate pH is desired, the build-up of cations in the cake results in a contaminated precipitate which is not desired.

If we were to substitute an anion exchange membrane as disclosed in U.S. Pat. No. 3,510,417 for the cation selective membrane of Wills at the anode, this would result in dialyzing of the filter cake. That is, although the anions which are attracted to the anode would pass through both the cake and the anion selective membrane, the cations in the anolyte solution would be trapped in the anolyte since they are impervious at the anion selective membrane so that most of the cations would be extracted from the cake toward the cathode ultimately causing a decrease in the pH of the cake due to the polarization effects adjacent to the membrane. If the pH of the cake is substantially reduced, as is the case when an anion selective membrane is used at the anode then the cake becomes flocculated which is undesirable.

The present invention overcomes the problems of both dialyzing and reverse dialyzing of the cake formed at the anode membrane so that a cake of suspension solids is formed which is extremely desirable, i.e., not contaminated and of moderate pH. Furthermore, the present invention overcomes the disadvantage of allowing electrolyte to diffuse or convect through the ionpervious walls of the prior art. The advantages of the non ion seletive membrane of the present invention will be further described below.

SUMMARY OF THE INVENTION

It is the primary object of the present invention to provide a system and apparatus for dewatering a suspension of solids in a carrier liquid by means of an EAVF. In particular, it is an object of the present invention to provide an EAVF system which includes an anodic electrode structure comprising an anode and a non ion selective membrane which is permeable to both cations and anions, and which is impermeable to suspension solids, carrier liquid, electrolyte, and gaseous products.

It is a further object of the present invention to provide a non ion selective membrane which comprises a substrate impregnated with a cation exchange resin, an anion exchange resin and a binder. According to the present invention the substrate is a cloth support. The present invention provides for a non ion selective membrane which has a charge transfer number wherein $t+$ is in the range from 0.20 to 0.80 and $t-$ is in the range of 0.80 to 0.20, preferably $t+ = t-$ which is approximately 0.50.

It is an object of the present invention to provide a non ion selective membrane around the anodic electrode, so that anions and cations may migrate across the membrane so that a more desirable cake is precipitated onto the membrane of the anodic electrode structure. This non ion selective membrane also prevents the loss of electrolyte from the anodic electrode structure.

It is also an object of the present invention that the non ion selective membrane may also be used as part of the cathodic electrode structure in those instances where it is desirable that both cations and anions be allowed to migrate through the membrane into the cathodic electrode structure from the bath.

Additionally, it is an object of the present invention to provide a non ion selective membrane comprising a porous, woven or unwoven, substantially inert common fiber substrate, and a solid polymeric film impregnating said substrate. The polymeric film is comprised of fine particles of a cation exchange resin and anion exchange resin and a water insoluble matrix of an organic binder essentially binding the particles to the fiber substrate and to each other, the binder having been precipitated onto the substrate from a mixture of binder, an organic solvent therefore and resin particles in suspension, by contact with a diluent characterized by a high degree of miscibility with the organic solvent and a relatively low degree of compatibility with the binder, forming an essentially continuous film of cation exchange resin, anion exchange resin and binder on the fiber substrate and in the interstices thereof, capability of receiving a deposit thereon in the form of a cake of particulate solids and having properties which allow the discharge of the cake, the non ion selective membrane being essentially impervious to water.

The present invention also provides that particles in suspension having negative zeta potentials will travel towards the anode under the influence of the electric field. If the suspended particles have positive zeta potentials, then conversely they would travel towards the cathode. In that instance where the zeta potential of the particles is positive, the membrane wall of the cathodic electrode structure would be the liquid impervious non ion selective membrane according to the present invention and the anode would have the liquid permeable filter.

The present invention may also include many additional features which shall be further described below.

BRIEF DESCRIPTION OF THE DRAWINGS

FIG. 2 is a sectional view of an EAVF system of the prior art comprising in anion selective membrance at the anode;

FIG. 3 is a sectional view of the EAVF system according to the present invention;

FIG. 4 is a graph which plots the percent of ions which pass through the membrane against the charge transfer number of the membrane;

DESCRIPTION OF THE PREFERRED EMBODIMENT

Figure 1:
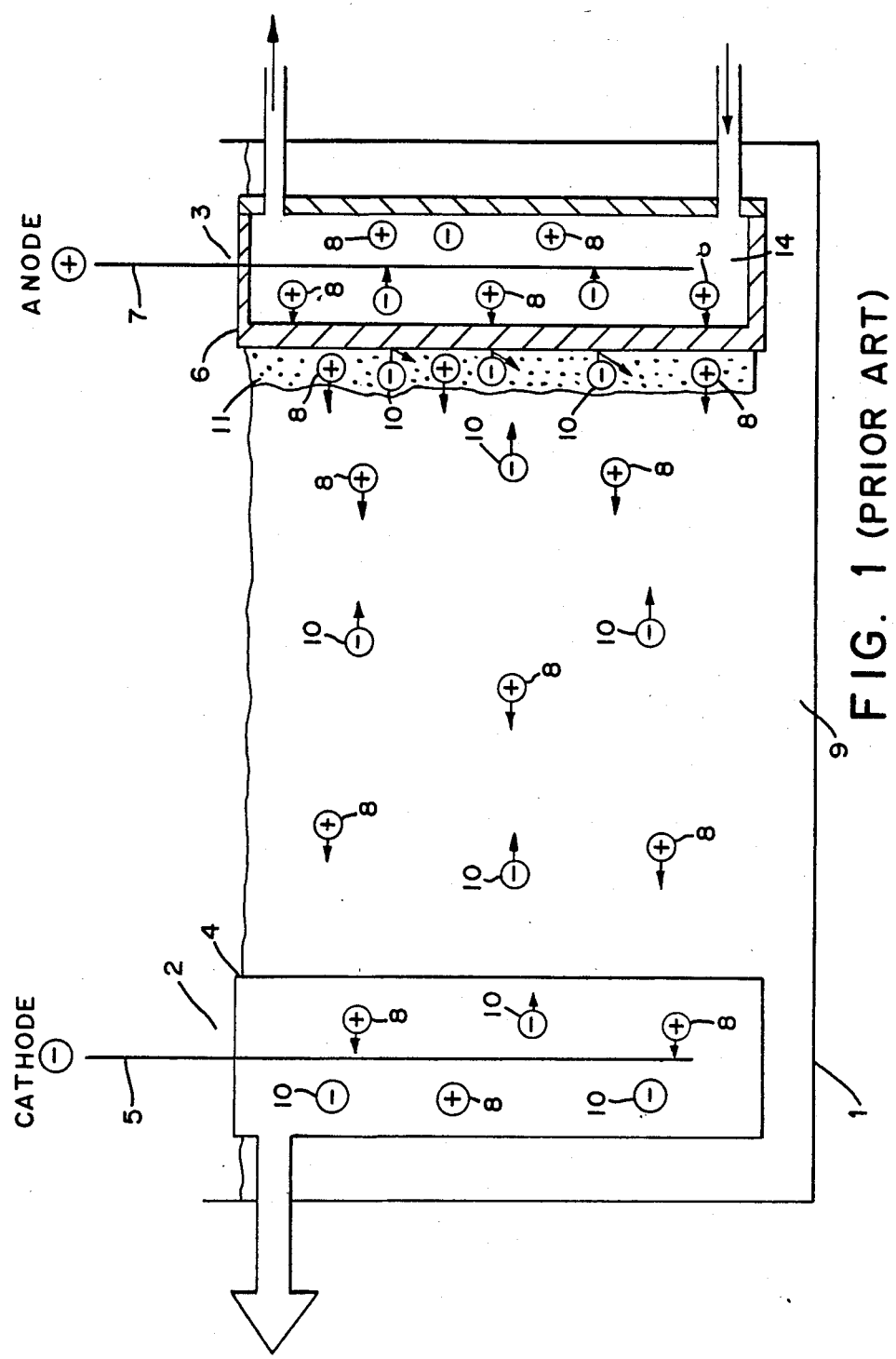
FIG. 1 is a sectional view of an EAVF system known in the prior art containing a cation selective membranes.

The process and apparatus for carrying out dewatering suspensions is disclosed in U.S. Pat. Nos. 4,168,222, issued Sept. 18, 1979 and 4,207,158 issued June 10, 1980. Our invention is an improvement over those earlier disclosures, wherein the present invention provides a system and apparatus for dewatering a suspension of solids in a carrier liquid by means of an EAVF system, similar to that described in U.S. Pat. Nos. 4,168,222 and 4,207,158, the improvement of which comprises at least a pair of self-containing mutually opposed electrode structures positioned in a tank containing the suspension of solids as a cathodic electrode structure and as an anodic electrode structure having between them a controllable electric field, while submerged in a suspension. The primary object of the present invention being that the anodic electrode structure has an anode and a liquid impervious wall, wherein the wall is a non ion selective membrane, such that the membrane is permeable to both cations and anions. The non ion selective membrane according to the present invention while being permeable to cations and anions is impermeable to the carrier liquid, solids of the suspension, gaseous products and electrolyte. The use of this non ion selective membrane overcomes disadvantages of the prior art as becomes clear in the following description of the preferred embodiments of the present invention.

Furthermore, the present invention provides a treatment system and apparatus for dewatering a suspension for solids in a carrier liquid subject to the influence of an electric field, which comprises, a treatment tank, feed means for supplying a flow of the suspension to the tank, with means for containing therein a body of the suspension of a predetermined maximum depth, a pair of self-contained mutually opposed electrode structures, each comprising a hollow body, positioned in the tank as a cathodic electrode structure and as an anodic electrode structure having between them a controllable electric field, while submerged in the suspension, the first of the electrode structures comprising a liquid pervious wall presenting a filtration area to the electric field, and adapted for the passage there-through of a flow of carrier liquid as filtrate separated from solids migrating in a direction away from the first electrode structure under the influence of the electric field, a filtrate vacuum supply connected to the hollow body of the first electrode structure, adapted to provide a pressure differential for effecting passage of the carrier liquid through the filtration area, filtrate withdrawal means for drawing filtrate liquid from the hollow body of the first electrode structure at a controlled rate, the second of the electrode structures comprising a non ion selective membrane and an electrode element within the hollow body spaced from the non ion selective membrane, means for introducing an electrolyte into the hollow body to occupy the space between the non ion selective membrane and the electrode element, the electrode structure adapted for the formation on the non ion selective membrane of a layer of cake of suspension solid under the influence of the electric field, cake recovery means including apparatus for lifting the second of the electrode structures out of the tank and removing and carrying away the cake deposited thereon, a second vacuum supply connected to the hollow body of the second electrode structure adapted to remove gaseous products evolved at the electrode element, means for withdrawing electrolyte from the second electrode structures so that fresh electrolyte maybe circulated through the second electrode structure to maintain a relatively constant electrolyte composition within the second electrode structure despite electrolyte decomposition at the electrode element.

FIG. 1 describes an EAVF system according to the prior art. In particular, FIG. 1 shows a tank 1 containing therein cathodic electrode structure 2 and anodic electrode structure 3. Cathodic electrode structure 2 comprising a liquid pervious wall 4 and electrode 5 which is electrically connected to a negative electrical terminal. The anodic electrode structure 3 comprises a cationic ion selective membrane 6 and electrode 7 which is electrically connected to a positive electrical terminal. In accordance with the prior art the cationic ion selective membrane 6 has deposited thereon a cake of suspension solids 11 which are attracted to the anode 7. The cationic ion selective membrane 6 permits cations 8 to migrate there-through into the bath 9 towards the cathode 5. However, the anions 10 which are attracted to the anode 7 migrate from the bath 9 into the cake 11 but are unable to pass through cationic ion selective membrane 6 and thus become trapped within the cake 11 along the membrane 6.

FIG. 2 demonstrates the use of an anionic ion selective membrane 12 as part of the anodic electrode structure 13. In this instance, the cations 8 in the anolyte 14 are unable to migrate through the anionic ion selective membrane 12, whereas the anions are allowed to migrate from the bath 9 through the cake 11 and across the anionic ion selective membrane 12 towards the anode 7. This causes a dialysis of the cake 11 by removal of cations 8 which migrate into the bath 9 from the cake 11 which results in the cake 11 being very acidic or flocculated due to the loss of hydroxyl ions. FIG. 1 on the other hand demonstrates reverse dialysis wherein the cake 11 retains the anions 10 which are unable to penetrate or diffuse through the cationic ion selective membranes 6, thus resulting in a contaminated cake. The precipitates which result during the dewatering of a suspension of solids by the devices shown in FIGS. 1 and 2 are not very desirous.

FIG. 3 describes the EAVF device according to the present invention. Accordingly, tank 15 contains a bath 16, cathodic electrode structure 17 and anodic electrode structure 18. The cathodic electrode structure 17 includes an liquid pervious wall 19 and an electrode 20 which is electrically connected to a negative terminal. The anodic electrode structure 18 includes electrode 21 and a non ion selective membrane 22, wherein electrolyte 23 is contained within the anodic electrode structure 18. In accordance with the present invention the non ion selective membrane 22 permits migration of either anions or cations, so that the cake 24 has an acceptable pH and a much more preferred purity. Moreover, non ion selective membrane 22 is impervious to suspended solids in the cake 24, carrier liquid in bath 16, electrolyte 23 and gaseous products produced by the electrode reactions. Thus, the system and apparatus according to the present invention not only results in producing an exceptional cake 24 but also prevents the diffussion and/or convection of electrolyte 23 into the cake 24 or bath 16, as well as diffusion of the bath 16 into anodic electrode structure 18 thereby preventing the dilution of electrolyte 23.

The non-ion selective membrane 22 comprises a substrate and a solid polymeric film. The substrate is a cloth and the solid polymeric film comprises a cation exchange resin, an anion exchange resin and a binder. The non ion selective membrane 22 has charge transfer numbers $t^{30}$ and $t^-$, wherein $t^+$ is in the range of 0.20 to 0.80 and $t^-$ is in the range of 0.80 to 0.20, respectively, and preferrably where $t^+ = t^-$ which is approximately 0.5. The cationic ion exchange membrane 6, shown in FIG. 1, has charge transfer numbers wherein $t = 1.0$ and $t^- = 0$ and the anionic ion selective membrane 12, shown in FIG. 2, has charge transfer numbers wherein $t^+ = 0$ and $t^- = 1.0$.

Moreover, the non ion selective membrane 22 comprises a porous, woven or unwoven substantially inert, fiber substrate, a solid polymeric film, impregnating the substrate, comprising fine particles of cation and anion exchange resins and a water insoluble matrix of an organic binder essentially permanently binding the particles to the fiberous substrate and to each other, the binder having been precipitated onto the substrate from a mixture of binder, an organic solvent therefore and resin particles in suspension, by contact with a diluent characterized by a high degree of miscibility with the organic solvent and a relatively low degree of compatibility with the binder, forming an essentially continuous film of cation/anion exchange resins and binder on the fiber substrate and in the interstices thereof capable of receiving a deposit thereon in the form of a cake of particulate solids, and a non ion selective membrane being essentially impervious to water.

FIG. 4 is a graph which plots percent of ions which pass through a membrane against the charge transfer number of the membrane. In accordance with FIG. 4, if the charge transfer numbers are $t^+=0$ and $t^-=1.0$, respectively, then the membrane would be an anionic ion selective membrane which is permeable only to anions (See Point A). The sum of the charge transfer numbers $t^+$ and $t^-$, by definition, equals 1.0. If the charge transfer numbers are $t^+=1.0$ and $t^-=0$, respectively, then the membrane would be a cationic ion selective membrane which is permeable only to cations (See Point C). The membrane according to the present invention for charge transfer numbers wherein $t^+$ is in the range of 0.20 to 0.80 and $t^-$ is in the range of 0.80 to 0.20, respectively, so that $t^+$ plus $t^-$ equals 1.0. It is preferrable that $t^+=t^-$ which is approximately 0.5 (See Point B). The membrane of the present invention, is a non ion selective membrane. If charge transfer number $t^+=1.0$ then only cations in a solution consisting of 50% anions and 50% cations would pass through the membrane. In this instance Point C reflects that 100% the cations in the bath are pervious to the membrane while 0% of the anions pass through the membrane. Thus, a membrane having a charge transfer number $t^+=1.0$ would constitute a cationic ion selective membrane. FIG. 4 demonstrates the effect that the charge transfer numbers $(t^+/t^-)$ of a membrane has on its ion selective characteristics.

EXAMPLE

A non ion selective membrane, according to the present invention, can be prepared by impregnating a strong relatively inert filter cloth such as Dynel ™, (Model No. S/182-003-00), with a solid polymeric film, the film comprising a mixture of anion exchange resin, cation exchange resin, and a binder. The non ion selective membrane having cation and anion transport properties and at the same time constituting a positive barrier to mass transport.

The non ion selective membrane formed according to the present invention has the following properties: (1) low hydraulic permeability; (2) low electrical resistance; (3) controlled selective ion transport; (4) controlled deposition quality of cake in an EAVF system; (5) strong film; (6) good film flexibility; (7) film does not crack when dried; (8) film is able to be re-wetted to re-establish original properties; (9) film can be used in aqueous environments when subjected to broad ranges of temperature and pH; (10) good chemical, physical and mechanical integrity for lasting wear; and (11) good release of deposited cake from the membrane surface.

Specifically, the non ion selective membrane of the present invention can be formed by the following process steps:

A. Spreading polysulfone pellets (Union Carbide No. P-3500 UDEL) no more than one inch in depth on a flat surface and dry at 275° F. (135° C.) for three and a half hours;

B. Prepare a thermoplastic solvate by adding the dried polysulfone pellets to clean Dimethyl Actamide (DMAC) and mixing in an enclosed low moisture environment until homogeneous, approximately 24 hours;

C. Prepare a casting mixture by adding an anion exchange resin and a cation exchange resin to the deaerated thermoplastic solvate, optionally adding a percentage of non-solvent as a dopant which may alter the membrane structure, thereafter mixing in an enclosed low moisture environment until homogeneous, approximately 24 hours;

D. Impregnate a non-creased Dynel ™ cloth with the above-prepared casting mixture;

E. Place the impregnated Dynel ™ cloth in water or optionally in a water/solvent, or water/solvent/nonsolvent solution to precipitate out the film which is permanently fixed to the Dyne ™ cloth other additives may be added to the precipitation bath (e.g. salts, acids, bases, surface active agents, etc.) which modify the precipitant morphology;

F. Continuously rinsing the membrane prepared by the previous steps for approximately three days in order to assure low electrical resistance and low solvent levels in the film matrix to control film self degradation and membrane lasting integrity;

G. Air drying the fully rinsed membrane; and

H. Re-wetting membrane by submerging the membrane in methanol for 1-3 hours or boil at 70°-80° C. with or without 0.1 N NaCl for 1-2 hours.

Note that in preparing a non ion selective membrane according to the above process steps the following compounds were used:

20% Polysulfone pellets
60% Dimethyl Acetamide
13.3% Amberlite Powder (Model No. IRP-69, Rohm & Haas)
6.7% Amberlite Powder (Model No. IRP-276, Rohm & Haas) Dynel ™ Cloth (Model No. S/182-003-00, National Filter Media)

Another preferred substrate is spun bo nd polyester (e.g. Hollytex 3329 from Filtration Science Corporation—Eaton Dikeman Division).

The above composition and procedures produce a non porous, ion permeable membrane with charge transfer numbers wherein $t^+=0.67$ and $t^-=0.33$. By changing the ratio of cationic exchange to anionic exchange resin, the present inventors have discovered that, membranes can be fabricated with charge transfer numbers $t^+$ ranging between 0-1.0.

In this regard, the ability to control the charge transfer number $(t^+/t^-)$ in the membrane is important because the transport of specific ions across the membrane is not only a function of the membrane, but also the chemistry of the system in contact with the membrane. For instance, if the electrolyte is $Na_2 SO_4$ in water, the $Na^+$ ions will transport more readily than $SO^4$. Effects which are particularly important include specific ion mobility, ion concentration, pH and the presence of other ions.

In accordance with the present invention it is to be understood that any pre-desired deposition quality (percent solids, conductivity and pH) can be attained for almost any

What is claimed is:

1. A non ion selective membrane comprising a porous, woven or unwoven, substantially inert, fiber substrate, a solid polymeric film inpregnating said substrate, comprising fine particles of cation exchange resin and anion exchange resin incorporated into a water insoluble matrix of an organic binder essentially permanently binding said particles to said fiber substrate and to each other, said binder having been precipitated onto said substrate from a mixture of binder, an organic solvent therefore and resin particles in suspension, by contact with a diluent characterized by a high degree of miscibility with said organic solvent and a relatively low degree of compatibility with said binder, forming an essentially continuous film of cation exchange resin, anion exchange resin and binder on said fiber substrate and in the interstices thereof capable of receiving a deposit thereon in the form of a cake of particulate solids, said non ion selective membrane being essentially impervious to water while being permeable to both cations and anions.

2. A process for making a non ion selective membrane comprising the steps of:
 A. Mixing a solvent with a binder to form a solvate;
 B. Mixing said solvate with an anion exchange resin and a cation exchange resin;
 C. Impregnating a substrate with the mixture formed in step B;
 D. Precipitating out a film comprising an anion exchange resin, a cation exchange resin and a binder, to form a membrane;
 E. Rinsing said membrane of step D;
 F. Drying the rinsed membrane; and
 G. Re-wetting the dried membrane of Step F.

* * * * *